(12) United States Patent
Yasuda

(10) Patent No.: US 8,339,351 B2
(45) Date of Patent: Dec. 25, 2012

(54) DISPLAY DEVICE

(75) Inventor: Kozo Yasuda, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 854 days.

(21) Appl. No.: 12/490,469

(22) Filed: Jun. 24, 2009

(65) Prior Publication Data

US 2009/0322731 A1 Dec. 31, 2009

(30) Foreign Application Priority Data

Jun. 25, 2008 (JP) ................................. 2008-165522

(51) Int. Cl.
*G09G 3/36* (2006.01)

(52) U.S. Cl. ................ 345/98; 345/87; 345/90; 345/204

(58) Field of Classification Search ............. 345/87–104, 345/204–215, 690–699
See application file for complete search history.

(56) References Cited

U.S. PATENT DOCUMENTS

| | | | | |
|---|---|---|---|---|
| 5,712,652 A | * | 1/1998 | Sato et al. ......................... | 345/90 |
| 6,778,162 B2 | * | 8/2004 | Kimura et al. .................... | 345/90 |
| 6,873,321 B2 | * | 3/2005 | Tsutsui .......................... | 345/204 |
| 6,967,649 B2 | * | 11/2005 | Sun ................................. | 345/211 |
| 7,173,589 B2 | * | 2/2007 | Senda et al. .................... | 345/90 |
| 7,696,952 B2 | * | 4/2010 | Kimura et al. ................... | 345/1.1 |
| 7,969,400 B2 | * | 6/2011 | Aoki et al. ....................... | 345/98 |
| 2002/0041266 A1 | * | 4/2002 | Koyama et al. ................. | 345/87 |
| 2002/0075205 A1 | * | 6/2002 | Kimura et al. .................. | 345/55 |
| 2002/0158858 A1 | * | 10/2002 | Tsutsui .......................... | 345/204 |
| 2003/0197673 A1 | * | 10/2003 | Nakamura ...................... | 345/99 |
| 2006/0221033 A1 | * | 10/2006 | Yasuda et al. ................... | 345/92 |
| 2008/0191989 A1 | * | 8/2008 | Lee et al. ........................ | 345/98 |

FOREIGN PATENT DOCUMENTS

JP 2006-285118 10/2006

* cited by examiner

*Primary Examiner* — Alexander Eisen
*Assistant Examiner* — Patrick F Marinelli
(74) *Attorney, Agent, or Firm* — Antonelli, Terry, Stout & Kraus, LLP.

(57) ABSTRACT

A display device includes a memory unit formed in each pixel to store video data and including a first inverter circuit whose input terminal is connected to a first node and whose output terminal is connected to a second node and a second inverter circuit whose input terminal is connected to the second node and whose output terminal is connected to the first node, a first transistor connected between the output terminal of the second inverter circuit and the video line, and a second transistor connected between the first node and the video line, in which at the time of reading the video data, the first transistor is turned ON, and the second transistor is turned OFF, to output the video data stored in the memory unit to the video line.

10 Claims, 6 Drawing Sheets

DISPLAY DEVICE

The present application claims priority from Japanese applications JP2008-165522 filed on Jun. 25, 2008, the content of which is hereby incorporated by reference into this application.

BACKGROUND OF THE INVENTION

1. Field of the Invention

The present invention relates to a display device such as a liquid crystal display device or an electroluminescent display device and more particularly to a display device in which a memory is arranged in each display pixel.

2. Background Arts

A high-performance liquid crystal display device with low power consumption has been known in which a memory unit is arranged in each display pixel in a liquid crystal display panel, and display data is stored in the memory unit, so that an image can be displayed on the liquid crystal display panel even when there is no input signal from outside (refer to Patent Document 1 below).

In the liquid crystal display device described in Patent Document 1, an X address circuit and a Y address circuit are arranged, and video data is written in a memory unit in a display pixel at a position selected by the X address circuit and the Y address circuit.

Further in the liquid crystal display device described in Patent Document 1, the memory unit in each display pixel, the X address circuit, and the Y address circuit are configured by using thin film transistors using polysilicon as semiconductor layers. Further, the X address circuit and the Y address circuit are configured integrally with and on the same substrate as that on which the memory unit in each display pixel of the liquid crystal display panel is formed.

The related art document relating to the invention is as follows:
Patent Document 1: JP-A-2006-285118

SUMMARY OF THE INVENTION

In a liquid crystal display device in which a memory unit is arranged in each display pixel of a liquid crystal display panel, if it is possible to read a data value stored in the memory unit in each display pixel, the movement or scrolling of a video can be performed only with hardware without the help of software by directly writing the read data value in a memory unit in another display pixel.

However, for example, in the liquid crystal display device in which the memory unit is arranged in each display pixel of the liquid crystal display panel, which is disclosed in Patent Document 1, the data value stored in the memory unit in each display pixel cannot be read.

The invention has been made to solve the problem in the related art. It is an object of the invention is to provide, in a display device in which a memory unit is arranged in each display pixel, a technology capable of reading a data value stored in the memory unit in each display pixel.

The above and other objects of the invention and the novel features thereof will be apparent from the description of the specification and the accompanying drawings.

Typical outlines of the invention disclosed herein will be briefly described below.

(1) A display device includes a display panel having a plurality of display pixels and a video line inputting video data to the display pixels. The display pixels each have a memory unit storing the video data. In a state of holding the video data stored in the memory unit, the memory unit includes a first inverter circuit whose input terminal is connected to a first node and whose output terminal is connected to a second node and a second inverter circuit whose input terminal is connected to the second node and whose output terminal is connected to the first node. The display pixel has a first transistor connected between the output terminal of the second inverter circuit and the video line and a second transistor connected between the first node and the video line. When the video data is read from the memory unit, the second transistor is turned OFF, and the first transistor is turned ON, to output the video data stored in the memory unit to the video line. When the video data is written, the first transistor is turned OFF, and the second transistor is turned ON, to input the video data supplied to the video line to the first node.

(2) In (1), the display pixel has a third transistor connected between the first node and the output terminal of the second inverter circuit, and the third transistor is turned OFF at the time of writing and reading the video data and turned ON at the time of storing the video data.

(3) In (2), the display panel has a logic circuit and a first scanning line, a second scanning line, and a third scanning line disposed for each display line and connected to the logic circuit. A gate electrode of the first transistor is connected to the first scanning line. A gate electrode of the second transistor is connected to the second scanning line. A gate electrode of the third transistor is connected to the third scanning line. A display line selection signal for selecting a display line where the writing and reading of the video data are executed and a read control signal for controlling the reading of the video data are input to the logic circuit. The logic circuit outputs a voltage for turning ON the first transistor to the first scanning line and voltages for turning OFF the second transistor and the third transistor to the second scanning line and the third scanning line, respectively, when the read control signal and the display line selection signal are at high level, and outputs a voltage for turning ON the second transistor to the second scanning line and voltages for turning OFF the first transistor and the third transistor to the first scanning line and the third scanning line, respectively, when the read control signal is at low level, and the display line selection signal is at high level.

(4) In (3), the logic circuit outputs a voltage for turning ON the third transistor to the third scanning line and voltages for turning OFF the first transistor and the second transistor to the first scanning line and the second scanning line, respectively, when the read control signal and the display line selection signal input to the logic circuit are at low level.

(5) A display device includes a display panel having a plurality of display pixels and a video line inputting video data to the display pixels. The display pixels each have a memory unit storing the video data. The memory unit includes a first inverter circuit whose input terminal is connected to a first node and whose output terminal is connected to a second node and a second inverter circuit whose input terminal is connected to the second node and whose output terminal is connected to the first node. The display pixel has a first transistor connected between the output terminal of the second inverter circuit and the first node and a second transistor connected between a first electrode of the first transistor and the video line. When the video data is read from the memory unit, the first transistor is turned OFF, and the second transistor is turned ON, to output the video data stored in the memory unit to the video line. When the video data is written, the first transistor and the second transistor are turned ON to input the video data supplied to the video line to the first node.

(6) In (5), the display pixel has a third transistor connected between the first electrode of the first transistor and the output terminal of the second inverter circuit, and the third transistor is turned OFF at the time of writing the video data and turned ON at the time of reading and storing the video data.

(7) In (6), the display panel has a logic circuit and a first scanning line, a second scanning line, and a third scanning line disposed for each display line and connected to the logic circuit. A gate electrode of the first transistor is connected to the first scanning line. A gate electrode of the second transistor is connected to the second scanning line. A gate electrode of the third transistor is connected to the third scanning line. A display line selection signal for selecting a display line where the writing and reading of the video data are executed and a read control signal for controlling the reading of the video data are input to the logic circuit. The logic circuit outputs voltages for turning ON the second transistor and the third transistor to the second scanning line and the third scanning line, respectively, and a voltage for turning OFF the first transistor to the first scanning line when the read control signal and the display line selection signal are at high level, and outputs voltages for turning ON the first transistor and the second transistor to the first scanning line and the second scanning line, respectively, and a voltage for turning OFF the third transistor to the third scanning line when the read control signal is at low level, and the display line selection signal is at high level.

(8) In (7), the logic circuit outputs voltages for turning ON the first transistor and the third transistor to the first scanning line and the third scanning line, respectively, and a voltage for turning OFF the second transistor to the second scanning line when the read control signal and the display line selection signal input to the logic circuit are at low level.

(9) In any of (3), (4), (7), and (8), the display device further includes a scanning line shift register circuit or a scanning line address circuit outputting the display line selection signal. The scanning line shift register circuit or the scanning line address circuit is formed integrally with the same substrate as that on which the memory unit of the display panel is formed.

(10) In any of (3), (4), (7), and (8), the display device further includes a video line shift register circuit or a video line address circuit selecting the video line. The video line shift register circuit or the video line address circuit is formed integrally with the same substrate as that on which the memory unit of the display panel is formed.

A typical effect provided by the invention disclosed herein will be briefly described below.

According to the invention, in a display device in which a memory unit is arranged in each display pixel, a data value stored in the memory unit in each display pixel can be read.

DESCRIPTION OF THE PREFERRED EMBODIMENTS

Figure 1:
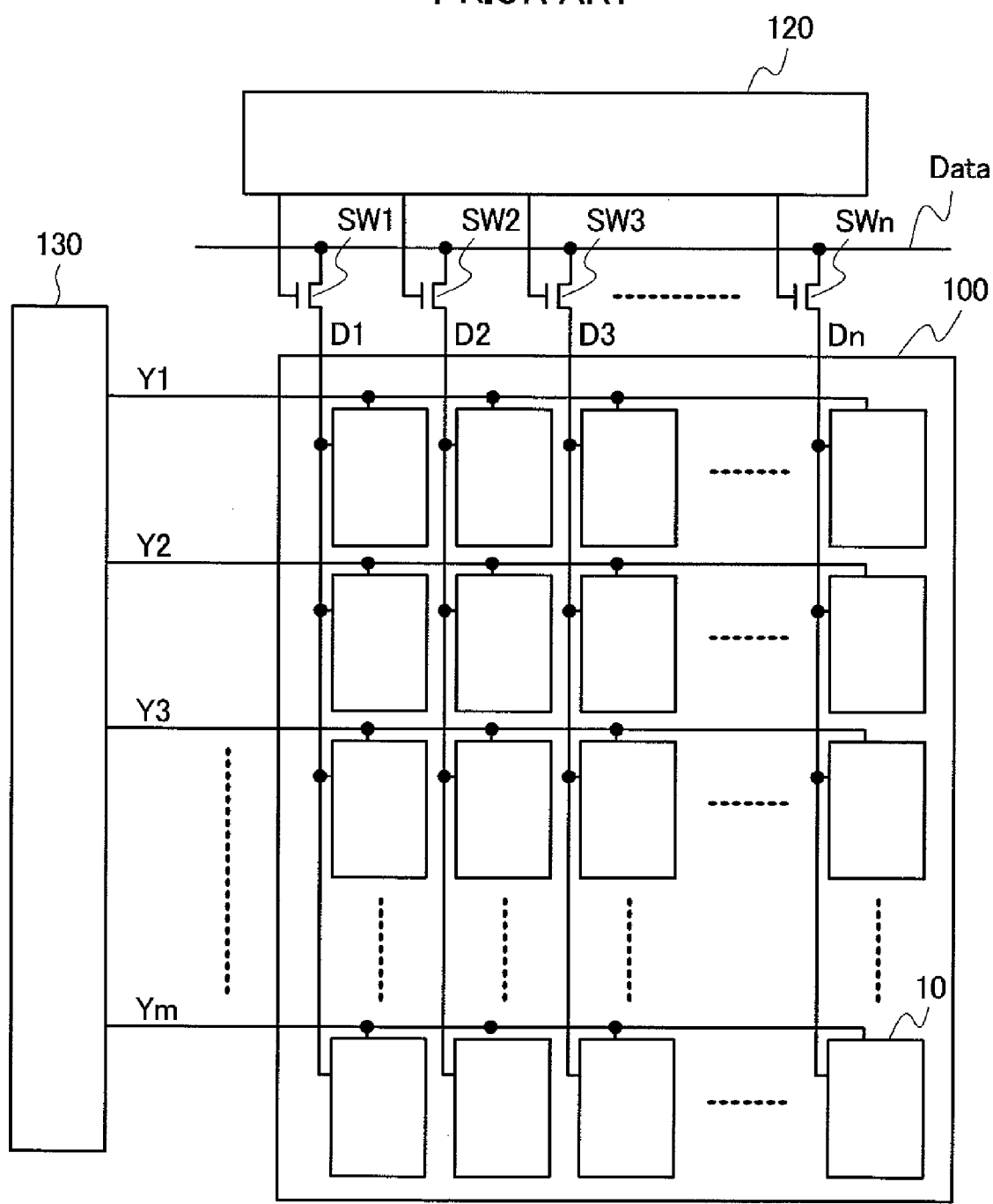
FIG. 1 shows a conventional structure of a liquid crystal display device which incorporates pixel memories.

Hereinafter, embodiments of the invention will be described in detail with reference to the drawings.

Throughout the drawings for explaining the embodiments, elements having the same function are denoted by the same reference numerals and signs, and the repetitive description thereof will be omitted.

Liquid Crystal Display Device as the Premise of the Invention

FIG. 1 is a block diagram showing a schematic configuration of a liquid crystal display device as the premise of the invention.

In FIG. 1, 100 denotes a display unit, 120 denotes an X-address circuit (also referred to as a video line address circuit), 130 denotes a Y-address circuit (also referred to as a scanning line address circuit), and 10 denotes display pixels.

The display unit 100 has the display pixels 10 which are arranged in a matrix, video lines (also referred to as drain lines) D1, D2, D3, . . . , and Dn each of which supplies display data to each of the display pixels 10, and scanning lines (also referred to as gate lines) Y1, Y2, Y3, . . . , and Ym each of which supplies a scanning signal to each of the display pixels 10.

The X-address circuit 120 has n output terminals. Each of the output terminals of the X-address circuit 120 is connected to a gate electrode of a thin film transistor which constitutes each of switching elements SW1, SW2, SW3, . . . , and SWn.

In the case where video data is written in the display pixel 10 at a position selected, the X-address circuit 120 turns ON a switching element SW corresponding to the display pixel 10 at the selected position among the switching elements SW1, SW2, SW3, . . . , and SWn, and video data is supplied from a data line Data from which the video data is supplied to a video line corresponding to the display pixel 10 at the selected position among the video lines D1, D2, D3, . . . , and Dn.

Similarly, the Y-address circuit 130 supplies a selection scanning voltage to a scanning line corresponding to the display pixel 10 at the selected position among the scanning lines Y1, Y2, Y3, . . . , and Ym.

Figure 2:
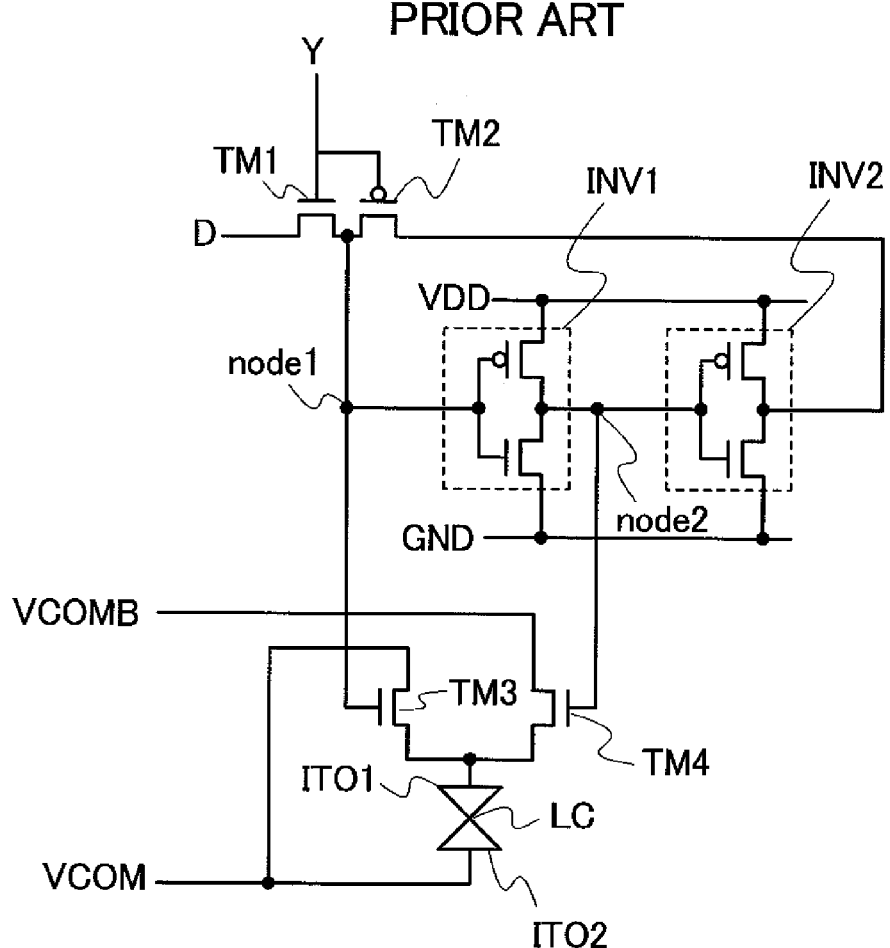
FIG. 2 is a circuit diagram showing an equivalent circuit of a display pixel shown in FIG. 1.

FIG. 2 is a circuit diagram showing an equivalent circuit of the display pixel 10 shown in FIG. 1.

In FIG. 2, a first inverter circuit INV1 and a second inverter circuit INV2 constitute a memory unit.

The first inverter circuit INV1 is connected to a node 1 at the input terminal and connected to a node 2 at the output terminal. The second inverter circuit INV2 is connected to the node 2 at the input terminal and connected to the node 1 at the output terminal. VDD denotes a power supply line to which a predetermined voltage is applied, and GND denotes a power supply line to which a voltage lower than that of VDD is applied. For example, a ground potential is applied to the GND.

The output terminal of the second inverter circuit INV2 is connected to the input terminal of the first inverter circuit INV1 via a p-type transistor TM2, which is turned ON in a normal state, that is, in a state where the memory unit is in a holding operation.

Accordingly, the output terminal of the second inverter circuit INV2 and the input terminal of the first inverter circuit INV1 may be directly connected to each other while omitting the p-type transistor TM2.

The drain electrode of an n-type transistor TM1 and the drain electrode of the p-type transistor TM2 are connected to the node 1, while the gate electrode of the n-type transistor TM1 and the gate electrode of the p-type transistor TM2 are connected to a scanning line Y.

Accordingly, when a selection scanning voltage, for example, a voltage of High level (hereinafter referred to as H level) is applied to the scanning line Y, the n-type transistor TM1 is turned ON, and the p-type transistor TM2 is turned OFF, to write video data (binary data of "1" or "0") to be applied to a video line D in the node 1. That is, a writing operation is performed.

When a non-selection scanning voltage, for example, a voltage of Low level (hereinafter referred to as L level) is applied to the scanning line Y, the n-type transistor TM1 is turned OFF, and the p-type transistor TM2 is turned ON, to hold the data value written in the node 1 in the memory unit formed of the first inverter circuit INV1 and the second inverter circuit INV2. That is, a holding operation is performed.

An n-type transistor TM3 whose gate electrode is connected to the node 1 is turned ON when the voltage of the node 1 is at the H level and applies a first video voltage (a voltage VCOM to be applied to a common electrode ITO2 in this case) to a pixel electrode ITO1.

An n-type transistor TM4 whose gate electrode is connected to the node 2 is turned ON when the node 2 is at the H level and applies a second video voltage (a voltage VCOMB which is obtained by inverting the voltage VCOM to be applied to the common electrode ITO2 by an inverter in this case) to the pixel electrode ITO1.

The relationship between the node 1 and the node 2 is the relationship where their signal levels are inverted to each other. Therefore, when the voltage of the node 1 is at the H level, the voltage of the node 2 is at the L level, whereby the n-type transistor TM3 is turned ON, and the n-type transistor TM4 is turned OFF. When the voltage of the node 1 is at the L level, the voltage of the node 2 is at the H level, whereby the n-type transistor TM3 is turned OFF, and the n-type transistor TM4 is turned ON.

In this way, a switch unit (which is formed of two transistors TM3 and TM4 having the same conductivity type, for example) selects the first video voltage or the second video voltage in accordance with data stored in the memory unit (data written from the video line D in the memory unit) and applies the selected voltage to the pixel electrode ITO1.

A liquid crystal LC is driven by an electric field generated between the pixel electrode ITO1 and the common electrode (also referred to as a counter electrode) ITO2 which is arranged facing the pixel electrode. The common electrode ITO2 may be formed on the same substrate as that on which the pixel electrode ITO1 is formed or may be formed on a different substrate.

The transistors constituting the inverter circuits INV1 and INV2 and the transistors TM1, TM2, TM3, and TM4 are formed of thin film transistors using polysilicon as semiconductor layers.

The X-address circuit 120 and the Y-address circuit 130 in FIG. 1 are circuits in the liquid crystal display panel. Similarly to the transistors constituting the inverter circuits INV1 and INV2 and the transistors TM1, TM2, TM3, and TM4, these circuits are formed of thin film transistors using polysilicon as semiconductor layers. These thin film transistors are formed simultaneously with the transistors or the like constituting the inverter circuits INV1 and INV2.

When a non-selection scanning voltage is applied to the scanning line Y, the transistor TM1 is turned OFF, and the transistor TM2 is turned ON, so that a data value written in the node 1 is held in the memory unit formed of the first inverter circuit INV1 and the second inverter circuit INV2. With this operation, an image is displayed on the display unit 100 even during a period without image input.

For example, in the case of a normally white liquid crystal display panel, "white" is displayed when "1" is written in the node 1 ("0" in the node 2), while "black" is displayed when "0" is written in the node 1 ("1" in the node 2).

In the case where there is no need to rewrite an image, since the operation of the X-address circuit 120 and the Y-address circuit 130 can be stopped, consumption power can be reduced.

Figure 3:
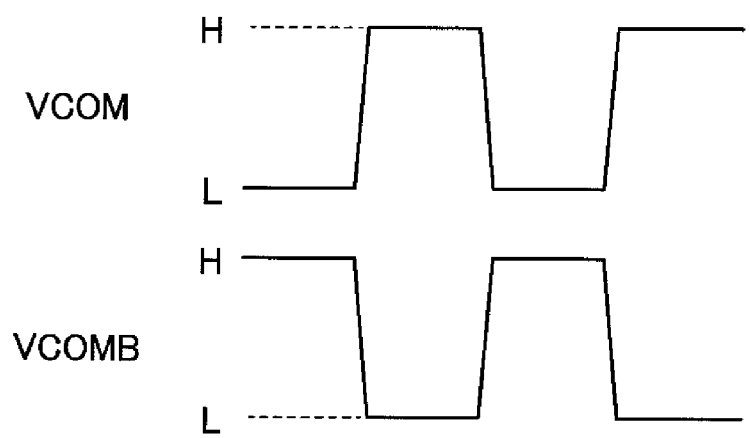
FIG. 3 shows waveforms of a voltage VCOM and a voltage VCOMB shown in FIG. 2.

FIG. 3 is an explanatory view of the inversion period of the voltage VCOM and the voltage VCOMB which is obtained by inverting the voltage VCOM in FIG. 2.

As an AC driving method of the liquid crystal display device shown in FIG. 1, a common inversion driving method is employed. In the liquid crystal display device shown in FIG. 1, it is sufficient only to change the voltage VCOM (the first video voltage) and the voltage VCOMB (the second video voltage) which is obtained by inverting the voltage VCOM, in accordance with the common inversion period as shown in FIG. 3. The voltage VCOM is inverted between the L level (0V, for example) and the H level (5V, for example) in accordance with the common inversion period. The voltage VCOMB can be generated by inverting the voltage VCOM with an inverter. The voltage VCOMB is at the H level when the voltage VCOM is at the L level, while the voltage VCOMB is at the L level when the voltage VCOM is at the H level. That is, the magnitude of the voltage VCOM and the magnitude of the voltage VCOMB are replaced with each other at a predetermined period.

First Embodiment

Figure 4:
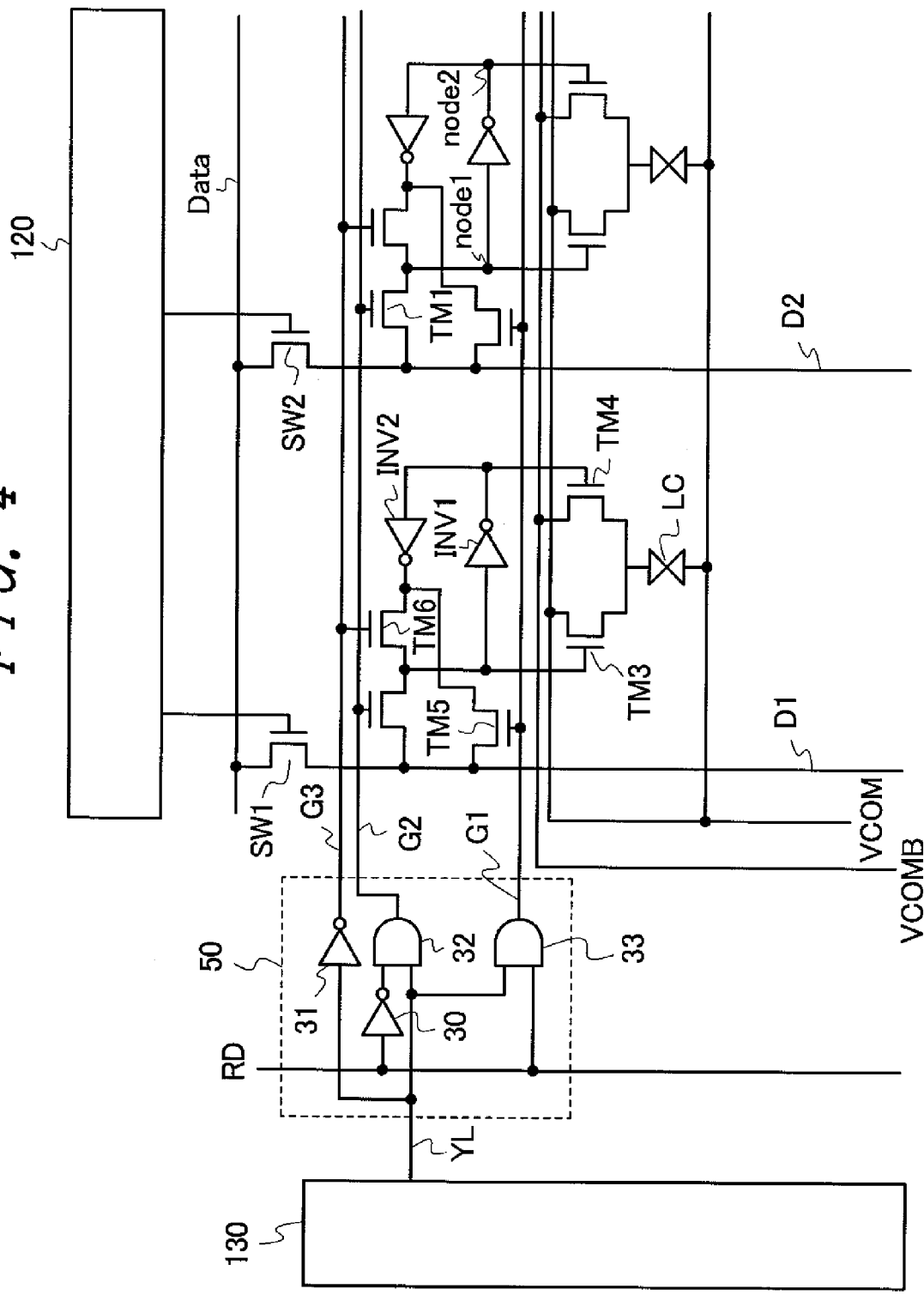
FIG. 4 shows a schematic configuration of a liquid crystal display device of a first embodiment of the invention.

FIG. 4 shows a schematic configuration of a liquid crystal display device of a first embodiment of the invention.

According to the liquid crystal display device of the embodiment, in a high-performance liquid crystal display device with low power consumption in which a memory unit is arranged in each display pixel in a liquid crystal display panel, and display data is stored in the memory unit, so that an image can be displayed on the liquid crystal display panel even when there is no input signal from outside, a data value stored in the memory unit can be read.

In the embodiment, the following points are different from the liquid crystal display device shown in FIG. 1:

(1) A transistor TM5 is added for reading a data value stored in a memory unit. The transistor TM5 is connected between the video line D and the output terminal of the second inverter circuit INV2.

(2) The number of scanning lines for each display line is increased from one to three. The gate electrode of the transistor TM5 is connected to a first scanning line G1, and the gate electrode of the transistor TM1 is connected to a second scanning line G2. A transistor TM6 is arranged instead of the transistor TM2 in FIG. 1. The gate electrode of the transistor TM6 is connected to a third scanning line G3.

(3) The first scanning line G1, the second scanning line G2, and the third scanning line G3 are connected to a logic circuit 50.
(4) A read control signal RD is newly added and input to the logic circuit 50.

In the embodiment, the logic circuit 50 includes an AND circuit 33, an AND circuit 32, and an inverter circuit 31. The AND circuit 33 takes a logical product between a display line selection signal (the selection scanning voltage of the H level or the non-selection scanning voltage of the L level) YL output from the Y-address circuit 130 and the read control signal RD and outputs the logical produce to the first scanning line G1. The AND circuit 32 takes a logical product between the display line selection signal YL output from the Y-address circuit 130 and the inverted signal of the read control signal RD inverted by an inverter circuit 30 and outputs the logical product to the second scanning line G2. The inverter circuit 31 inverts the display line selection signal YL output from the Y-address circuit 130 and outputs the inverted signal to the third scanning line G3.

The X-address circuit 120 and the Y-address circuit 130 of the first embodiment and a second embodiment described later are circuits in the liquid crystal display panel. Similarly to the transistors constituting the inverter circuits INV1 and INV2 and the transistors TM1, TM3, TM4, TM5, and TM6, these circuits are formed of thin film transistors whose semiconductor layers are made of polysilicon layers. These thin film transistors are formed simultaneously with the transistors or the like constituting the inverter circuits INV1 and INV2.

In the embodiment, although the n-type transistor TM6 is used instead of the p-type transistor TM2 shown in FIG. 2, the p-type transistor TM2 can also be used similarly to FIG. 2. In that case, the inverter circuit 31 is not required.

Also in the embodiment, an X-shift register circuit may be used instead of the X-address circuit 120, and a Y-shift register circuit may be used instead of the Y-address circuit 130.

Hereinafter, an operation of the liquid crystal display device of the embodiment will be described by using timing charts in FIGS. 5A and 5B. First, the reading of a data value stored in a memory unit will be described.

Figure 5A:
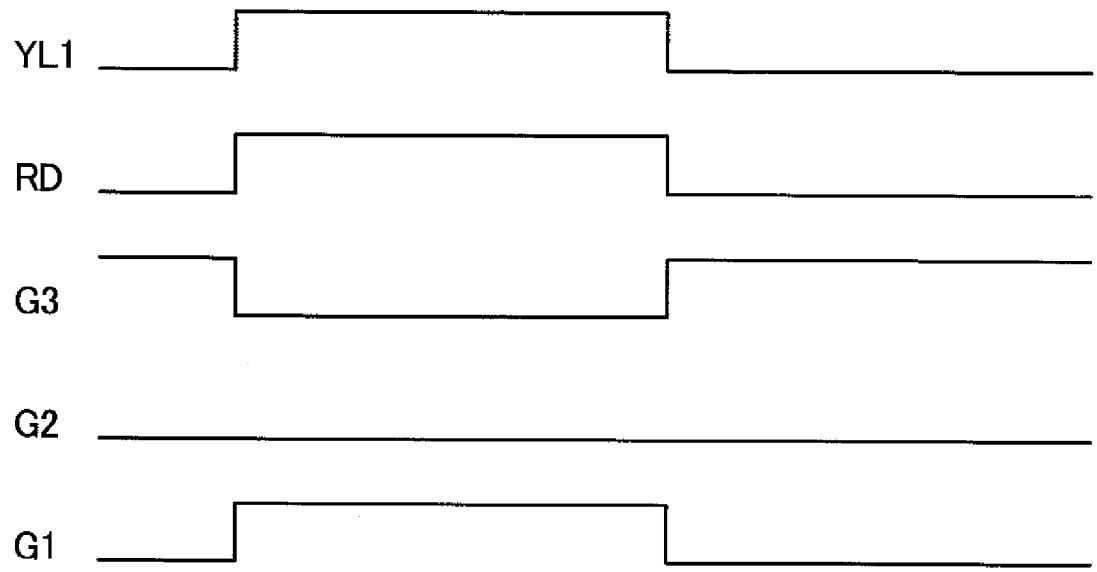
FIGS. 5A and 5B are timing charts for explaining an operation of the liquid crystal display device of the first embodiment of the invention.

When a data value stored in a memory unit is read, as shown in FIG. 5A, a display line to be read is selected by the Y-address circuit 130. In this case, the first display line YL1 is selected, to which the selection scanning voltage of the H level is output in order to render the display line selection signal effective.

Next, as shown in FIG. 5A, the read control signal RD is set to the H level in order to render the same effective. With this operation, voltages shown in FIG. 5A are output from the inverter circuit 31, the AND circuit 32, and the AND circuit 33 in the logic circuit 50 to the first scanning line G1, the second scanning line G2, and the third scanning line G3.

At this time, since the first scanning line G1 is at the H level, and the second scanning line G2 and the third scanning line G3 are at the L level, the transistor TM5 is turned ON, and the transistor TM1 and the transistor TM6 are turned OFF.

Accordingly, a data value stored in a memory unit (an output voltage of the second inverter circuit INV2) is read to the video line D.

Figure 5B:
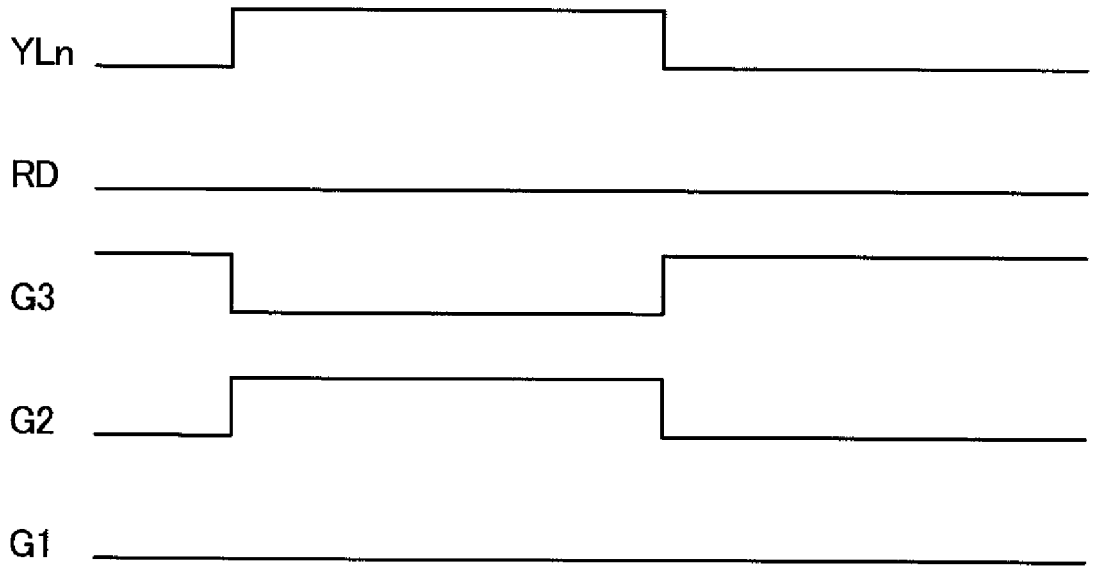

Next, in order to write the data value read to the video line D in another memory unit, a display line in which the data value is to be written is first selected by the Y-address circuit 130 as shown in FIG. 5B. In this case, an n-th display line YLn is selected, to which the selection scanning voltage of the H level is output in order to render the display line selection signal effective.

In writing, as shown in FIG. 5B, the read control signal RD remains at the L level. With this operation, voltages shown in FIG. 5B are output from the inverter circuit 31, the AND circuit 32, and the AND circuit 33 in the logic circuit 50 to the first scanning line G1, the second scanning line G2, and the third scanning line G3.

At this time, since the second scanning line G2 is at the H level, and the first scanning line G1and the third scanning line G3 are at the L level, the transistor TM1 is turned ON, and the transistor TM5 and the transistor TM6 are turned OFF.

With this operation, the read data value (that is, the data value recorded in the memory unit on the first display line YL1) is written in a memory unit on the n-th display line YLn. In this way, the movement of data is performed. The data movement is continuously performed, so that the scroll display can be performed.

Second Embodiment

Figure 6:
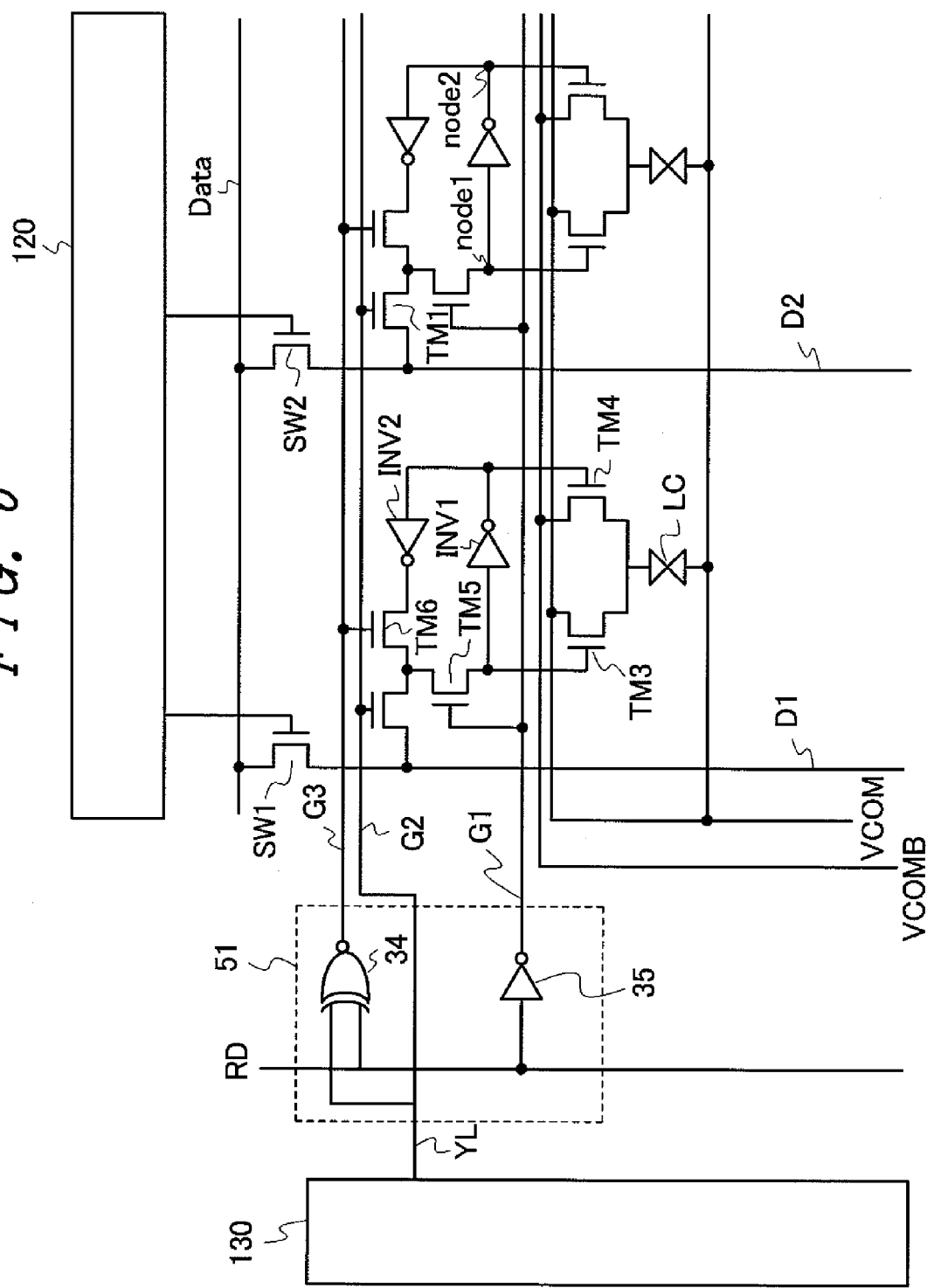
FIG. 6 shows a schematic configuration of a liquid crystal display device of a second embodiment of the invention.

FIG. 6 shows a schematic configuration of a liquid crystal display device of a second embodiment of the invention.

In the embodiment, the following points are different from the liquid crystal display device shown in FIG. 4:
(1) The transistor TM5 which is added for reading a data value stored in a memory unit is connected between the drain of the transistor TM1 and the node 1.
(2) A logic circuit 51 includes a coincidence circuit 34 and an inverter circuit 35. The coincidence circuit 34 establishes coincidence between the display line selection signal (the selection scanning voltage of the H level or the non-selection scanning voltage of the L level) YL output from the Y-address circuit 130 and the read control signal RD and outputs the coincidence signal to the third scanning line G3. The inverter circuit 35 inverts the read control signal RD and outputs the inverted signal to the first scanning line G1. The display line selection signal YL output from the Y-address circuit 130 is output to the second scanning line G2.

In the embodiment, although the n-type transistor TM6 is used instead of the p-type transistor TM2 shown in FIG. 2, the p-type transistor TM2 can also be used similarly to FIG. 2. In that case, an EX-OR circuit may be used instead of the coincidence circuit 34.

Also in the embodiment, an X-shift register circuit may be used instead of the X-address circuit 120, and a Y-shift register circuit may be used instead of the Y-address circuit 130.

Hereinafter, an operation of the liquid crystal display device of the embodiment will be described by using timing charts in FIGS. 7A and 7B. First, the reading of a data value stored in a memory unit will be described.

Figure 7A:
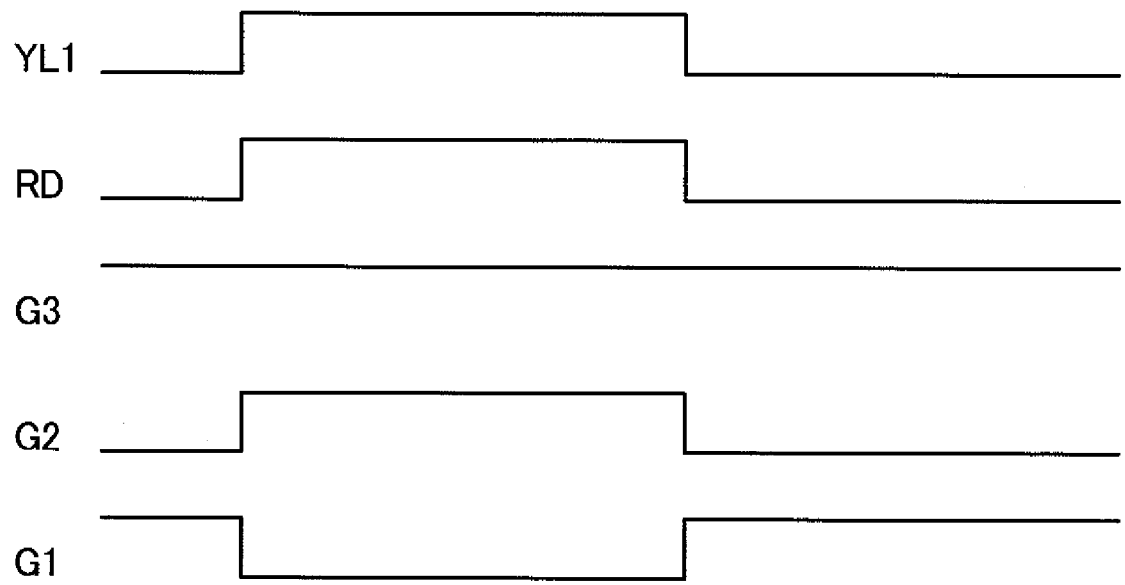
FIGS. 7A and 7B are timing charts for explaining an operation of the liquid crystal display device of the second embodiment of the invention.

When a data value stored in a memory unit is read, as shown in FIG. 7A, a display line to be read is selected by the Y-address circuit 130. In this case, the first display line YL1 is selected, to which the selection scanning voltage of the H level is output in order to render the display line selection signal effective.

Next, as shown in FIG. 7A, the read control signal RD is set to the H level in order to render the same effective. With this operation, voltages shown in FIG. 7A are output from the inverter circuit 35 and the coincidence circuit 34 in the logic circuit 51 to the first scanning line G1 and the third scanning line G3. Further, the selection scanning voltage of the H level is output to the second scanning line G2 as shown in FIG. 7A.

At this time, since the second scanning line G2 and the third scanning line G3 are at the H level, and the first scanning line G1 is at the L level, the transistor TM5 is turned OFF, and the transistor TM1 and the transistor TM6 are turned ON.

Accordingly, a data value stored in a memory unit (an output voltage of the second inverter circuit INV2) is read to the video line D.

Figure 7B:
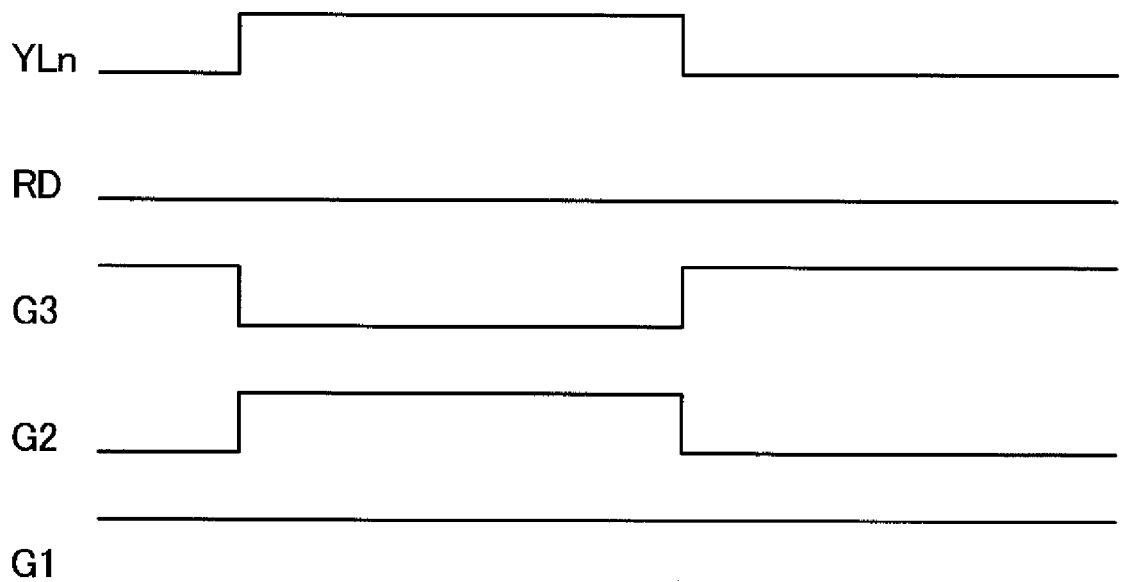

Next, in order to write the data value read to the video line D in another memory unit, a display line in which the data value is to be written is first selected by the Y-address circuit 130 as shown in FIG. 7B. In this case, an n-th display line YLn is selected, to which the selection scanning voltage of the H level is output in order to render the display line selection signal effective.

In writing, as shown in FIG. 7B, the read control signal RD remains at the L level. With this operation, voltages shown in FIG. 7B are output from the inverter circuit 35 and the coincidence circuit 34 in the logic circuit 51 to the first scanning line G1 and the third scanning line G3. Further, the selection scanning voltage of the H level is output to the second scanning line G2 as shown in FIG. 7B.

At this time, since the first scanning line G1 and the second scanning line G2 are at the H level, and the third scanning line G3 is at the L level, the transistor TM6 is turned OFF, and the transistor TM1 and the transistor TM5 are turned ON.

With this operation, the read data value (that is, the data value recorded in the memory unit on the first display line YL1) is written in a memory unit on the n-th display line YLn. In this way, the movement of data is performed. The data movement is continuously performed, so that the scroll display can be performed.

As described above, according to the embodiments, since a data value recorded in a memory unit in each display pixel can be read, the movement or scrolling of a video can be performed only with hardware without the help of software by directly writing the read data value in a memory unit in another display pixel. With this operation, it is possible to improve imaging speed and decrease power at the time of display.

Although the embodiments have been described in which the invention is applied to a liquid crystal display device, the invention is not limited thereto. It is needless to say that the invention can be applied to an organic electroluminescent display device or the like.

Further, although the embodiments have been described in which a peripheral circuit (the X-address circuit 120 or the Y-address circuit 130, for example) is incorporated into a liquid crystal display panel (formed integrally with and on a substrate of a liquid crystal display panel), the invention is not limited thereto. Apart of the functions of a peripheral circuit may be configured by using a semiconductor ship.

Still further, although the embodiments have been described in which a MOS transistor is used as a thin film transistor, a MIS transistor whose concept is wider than that of a MOS transistor may be used.

While the invention made by the inventor has been specifically described so far based on the embodiments, it is apparent that the invention is not limited to the embodiments but can be modified variously within a range not departing from the gist thereof.

What is claimed is:

1. A display device comprising:
   a display panel having a plurality of display pixels and a video line inputting video data to the display pixels;
   the display pixels each having a memory unit storing the video data;
   the memory unit including a first inverter circuit, whose input terminal is connected to a first node and whose output terminal is connected to a second node, and a second inverter circuit, whose input terminal is connected to the second node and whose output terminal is connected to the first node;
   wherein the display pixel has a first transistor, directly connected between the output terminal of the second inverter circuit and the video line, and a second transistor, directly connected between the first node and the video line;
   wherein when the video data is read from the memory unit the first transistor is turned ON and the second transistor is turned OFF in order to output the video data stored in the memory unit to the video line; and
   wherein when the video data is written into the memory unit the first transistor is turned OFF and the second transistor is turned ON in order to input the video data supplied to the video line to the first node.

2. The display device according to claim 1, wherein the display pixel has a third transistor connected between the first node and the output terminal of the second inverter circuit; and
   the third transistor is turned OFF at the time of writing and reading the video data and turned ON at the time of storing the video data.

3. The display device according to claim 2, wherein the display panel has a logic circuit, a first scanning line, a second scanning line, and a third scanning line disposed for each display line and connected to the logic circuit;
   wherein a gate electrode of the first transistor is connected to the first scanning line;
   wherein a gate electrode of the second transistor is connected to the second scanning line;
   wherein a gate electrode of the third transistor is connected to the third scanning line;
   wherein a display line selection signal is used for selecting a display line where the writing and reading of the video data are executed, and a read control signal is used for controlling the reading of the video data that is input to the logic circuit;
   wherein the logic circuit outputs a voltage for turning ON the first transistor to the first scanning line and voltages for turning OFF the second transistor and the third transistor to the second scanning line and the third scanning line, respectively, when the read control signal and the display line selection signal are at high level; and
   wherein the logic circuit outputs a voltage for turning ON the second transistor to the second scanning line, and voltages for turning OFF the first transistor and the third transistor to the first scanning line and the third scanning line, respectively, when the read control signal is at low level and the display line selection signal is at high level.

4. The display device according to claim 3, wherein the logic circuit outputs a voltage for turning ON the third transistor to the third scanning line, and voltages for turning OFF the first transistor and the second transistor to the first scanning line and the second scanning line, respectively, when the read control signal and the display line selection signal are at low level.

5. The display device according to claim 3, further comprising:
   a scanning line shift register circuit or a scanning line address circuit outputting the display line selection signal;
   wherein the scanning line shift register circuit or the scanning line address circuit is formed integrally with the same substrate as that on which the memory unit of the display panel is formed.

6. The display device according to claim 3, further comprising:
a video line shift register circuit or a video line address circuit selecting the video line;
wherein the video line shift register circuit or the video line address circuit is formed integrally with the same substrate as that on which the memory unit of the display panel is formed.

7. A display device comprising:
a display panel having a plurality of display pixels and a video line inputting video data to the display pixels;
the display pixels each having a memory unit storing the video data;
the memory unit including a first inverter circuit, whose input terminal is connected to a first node and whose output terminal is connected to a second node, and a second inverter circuit, whose input terminal is connected to the second node and whose output terminal is connected to the first node;
wherein the display pixel has a first transistor, directly connected between the output terminal of the second inverter circuit and the first node, and a second transistor, directly connected between a first electrode of the first transistor and the video line;
wherein when the video data is read from the memory unit, the first transistor is turned OFF and the second transistor is turned ON in order to output the video data stored in the memory unit to the video line; and
wherein when the video data is written into the memory unit, the first transistor and the second transistor are turned ON in order to input the video data supplied to the video line to the first node.

8. The display device according to claim 7, wherein the display pixel has a third transistor connected between the first electrode of the first transistor and the output terminal of the second inverter circuit; and the third transistor is turned OFF at the time of writing the video data and turned ON at the time of reading and storing the video data.

9. The display device according to claim 8,
wherein the display panel has a logic circuit, a first scanning line, a second scanning line, and a third scanning line disposed for each display line and connected to the logic circuit,
wherein a gate electrode of the first transistor is connected to the first scanning line;
wherein a gate electrode of the second transistor is connected to the second scanning line;
wherein a gate electrode of the third transistor is connected to the third scanning line;
wherein a display line selection signal is used for selecting a display line where the writing and reading of the video data are executed, and a read control signal is used for controlling the reading of the video data that is input to the logic circuit,
wherein the logic circuit outputs voltages for turning ON the second transistor and the third transistor to the second scanning line and the third scanning line, respectively, and a voltage for turning OFF the first transistor to the first scanning line when the read control signal and the display line selection signal are at high level; and
wherein the logic circuit outputs voltages for turning ON the first transistor and the second transistor to the first scanning line and the second scanning line, respectively, and a voltage for turning OFF the third transistor to the third scanning line when the read control signal is at low level and the display line selection signal is at high level.

10. The display device according to claim 9, wherein
the logic circuit outputs voltages for turning ON the first transistor and the third transistor to the first scanning line and the third scanning line, respectively, and a voltage for turning OFF the second transistor to the second scanning line when the read control signal and the display line selection signal input to the logic circuit are at low level.

* * * * *